Oct. 7, 1941.  F. W. BLANCHARD ET AL  2,258,172
SAFETY VALVE FOR LOCOMOTIVES
Filed June 1, 1939  2 Sheets-Sheet 1

INVENTORS
FREDERICK.W.BLANCHARD
FREDERICK.D.STIRLING
BY J.D.O'Connell
ATTORNEY

INVENTORS
FREDERICK.W.BLANCHARD
FREDERICK.D.STIRLING
BY J.D.O'Connell
ATTORNEY

Patented Oct. 7, 1941

2,258,172

UNITED STATES PATENT OFFICE 2,258,172

SAFETY VALVE FOR LOCOMOTIVES

Frederick W. Blanchard, Hampstead, Quebec, and Frederick D. Stirling, Montreal, Quebec, Canada, assignors to T. McAvity & Sons Ltd., Montreal, Quebec, Canada Application June 1, 1939, Serial No. 276,893

6 Claims. (Cl. 137—53)

This invention relates to safety valves and has for its object the provision of a generally improved pop safety valve for locomotives and other high pressure steam boilers.

An important feature of the invention resides in the provision of a valve assembly in which the construction and anchorage of the valve seat bushing is such as to prevent distortion of the bushing and other parts being transmitted to the valve seat. Accordingly, the bushing is made so that its lower end comprises a relatively thick and heavy ring of metal affording an outwardly directed anchoring flange which is clamped in place between the boiler flange and a clamping flange attached to the lower end of the valve casing. The mass of the bushing flange is such that distortion strains transmitted to the rest of the bushing by compression of this flange between the boiler flange and the clamping flange are relatively small. As a further safeguard against distortion of the valve seat a portion of the bushing wall immediately adjacent the anchoring flange is shaped to afford sufficient springiness to absorb the relatively small distortion strains transmitted thereto by the compression of the bushing flange between the boiler and clamping flanges. Aside from being clamped in place between the said boiler and clamping flanges the bushing has no threaded or other distortion transmitting connections with these or other parts of the valve assembly.

A further feature of the invention resides in providing the bushing and the clamping flange of the valve casing with cooperating elements whereby the bushing is prevented from dropping out of the valve casing when the valve assembly is detached from the boiler, said cooperating elements of the bushing and clamping flange also serving to facilitate removal of the bushing as a unit with the other parts of the valve assembly.

The foregoing and other features of the invention will now be described in detail in connection with the accompanying drawings, in which—

Figure 1:
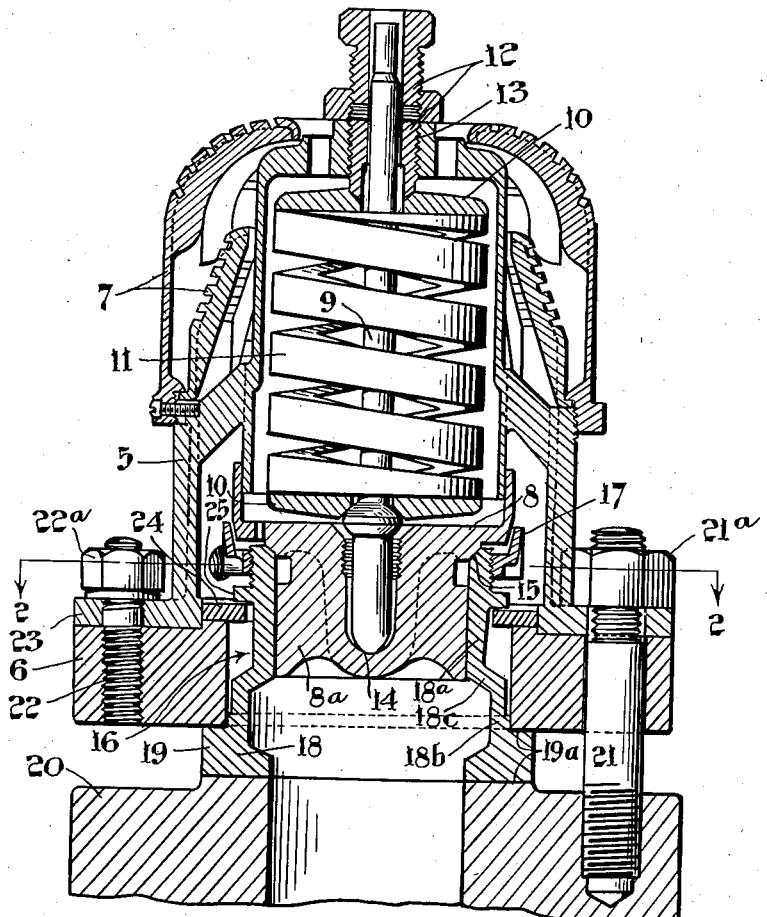
Fig. 1 is a vertical sectional view of our improved safety valve assembly as it appears in applied position.
Figure 2:
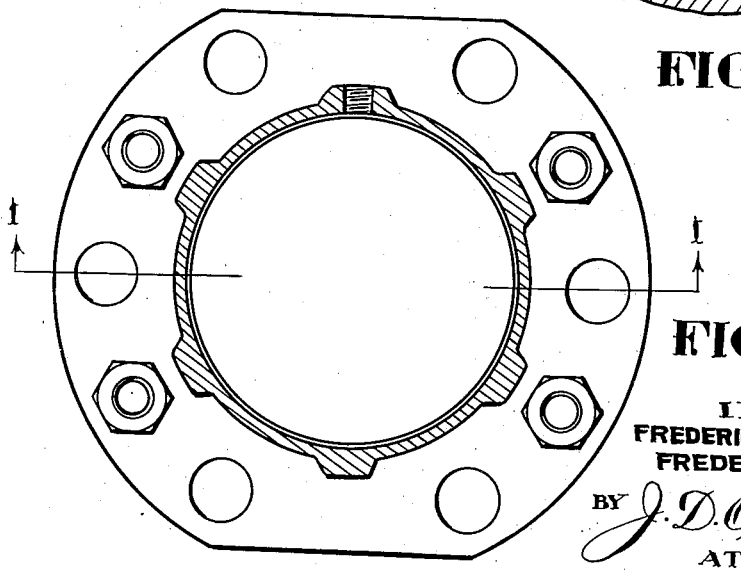
Fig. 2 is a transverse sectional view of the casing taken substantially along the line 2—2 of Fig. 1.

In the present drawings our invention is shown embodied in a safety pop valve assembly of the muffled type. Conventional parts of this assembly include the body 5; the body flange 6; the inside and outside mufflers 7; the valve disk 8; the spring loaded valve closing spindle 9; the spring plates 10; the valve closing spring 11 confined between said plates; and the spring adjusting screw 12, the latter being threaded through the body opening 13 so that its lower end bears against the upper spring plate 10. The spindle 9 is arranged in the conventional manner with its upper portion guided in the bore of adjusting screw 12 and its lower end bearing against the bottom wall of the spindle recess 14 formed in the guide portion 8a of valve disk 8.

The downward thrust of the spring loaded spindle 9 serves to close the valve disk 8 against the circular valve seat 15 provided at the upper end of the seat bushing 16. The upper end of bushing 16 is also externally threaded to receive thereon the internally threaded blow-down ring 17.

According to the present invention, seat bushing 16 is cast so that its lower end comprises a relatively thick and heavy ring of metal indicated at 18. The outer portion of ring 18 provides an outwardly directed flange 19 which is tightly clamped between the body flange 6 and the boiler flange 20 when the two last mentioned flanges are bolted together by bolts 21 and clamping nuts 21a. In this connection it will be noted that the body flange 6 is fastened, by stud bolts 22 and clamping nuts 22a, to an outwardly directed rim or flange 23 provided at the lower end of the body casting 5.

A split washer 24 is supported by the inner portion of body flange 6 so that the inner peripheral portion of said washer underlies an annular rib or flange 25 formed on the upper part of the seat bushing 16. When the complete valve assembly is bolted in place as shown in Fig. 1, flange 25 lies above and out of contact with washer 24. The purpose of washer 24 is to facilitate removal of the seat bushing 16 as a unit with the body casting 5 and the body flange 6. When the body casting 5 and the attached body flange 6 are raised from the boiler following removal of the fastening nuts 21a the seat bushing 16 will also be lifted with these parts by reason of the fact that the washer 24 is raised into supporting engagement with the bushing flange 25. In this case the spring load on the bushing 16 is taken by washer 24 and body flange 6. When the valve assembly is bolted to the boiler as shown in Fig. 1, the resulting separation of washer 24 and bushing flange 25 prevents distortion strains being transmitted to the bushing through said washer.

The bushing flange 19 has sufficient mass so that compression thereof between the body flange 6 and the boiler flange 20 results only in the transmission of very small distortion strains to the circular wall of the bushing located immediately above said bushing flange. It will also be noted that the circular wall of the bushing located above ring 18 and flange 19 has no threaded or other distortion transmitting connection with the body casting 5, body ring 6 or washer 24. It will also be observed that the annular wall of the seat bushing lying above ring 18 comprises upper and lower annular portions 18a and 18b of different diameters joined together by an intermediate portion 18c which is diagonally inclined with respect to the axial center line of the bushing. This construction affords a certain amount of springiness adjacent ring 18 which is sufficient to absorb, in the lower part of the bushing, all distortion strains set up by compression of flange 19 between the clamping flanges 6 and 20. Distortion strains resulting from this source are thereby effectively absorbed in the lower portion of the bushing before they can reach and seriously affect the surface of the valve seat.

The flange forming portion 19 of bushing ring 18 is provided with parallel upper and lower flat surfaces 19a which are finished off to make tight steam joint contact with engaging parallel surfaces of the body flange 6 and boiler flange 20.

Figure 3:
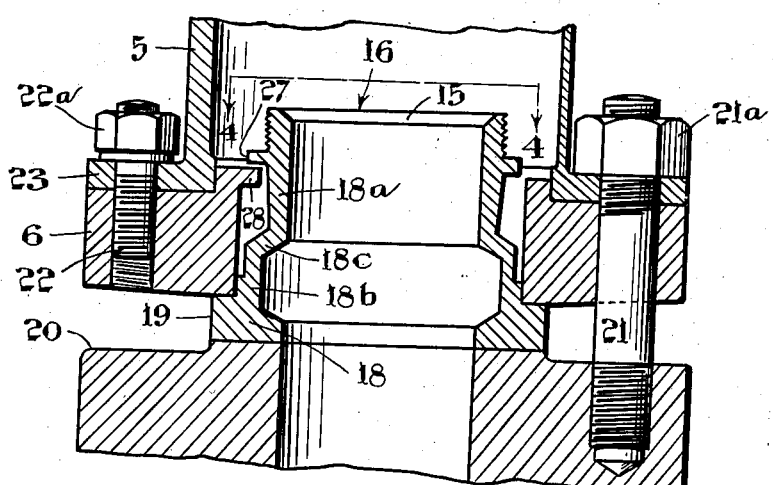
Fig. 3 is a fragmentary sectional view showing a slight modification.
Figure 4:
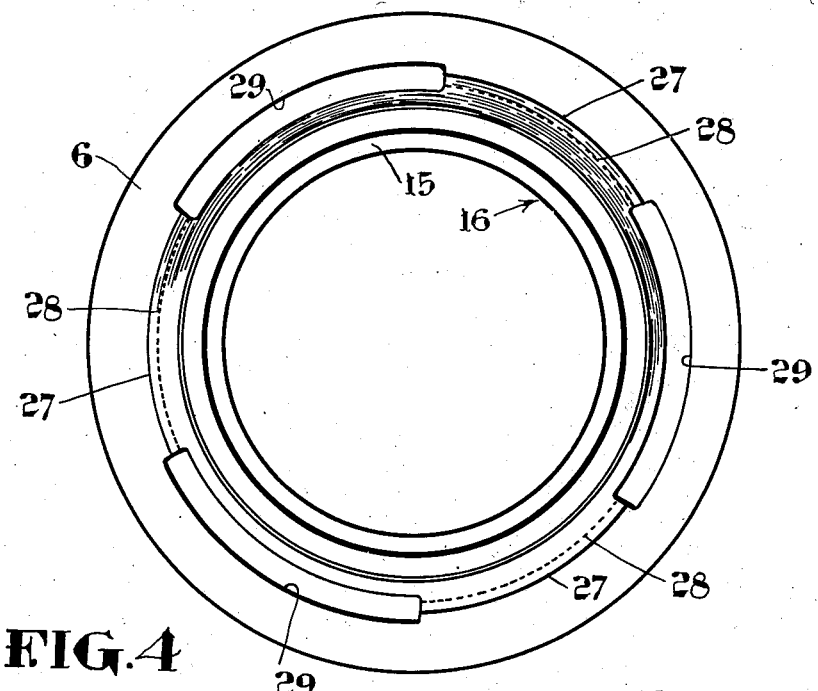
Fig. 4 is a transverse sectional view taken substantially along the line 4—4 of Fig. 3.

In Figs. 3 and 4 we have shown a slight modification in which the washer 24 is eliminated. In this case seat bushing 16 is provided with a plurality of circumferentially spaced laterally projecting lugs 27. When the valve assembly is bolted to the boiler these lugs are located directly above and in spaced relation to similar lugs 28 projecting inwardly from the upper inner portion of the body ring 6. In this case the lugs 28 serve the same purpose as the previously mentioned washer 24. Aside from simplifying the construction by eliminating washer 24, the arrangement shown in Figs. 3 and 4 has the further advantage that seat bushing 16 may be removed through body ring 6 when said bushing is turned to a position such that its lugs 27 are aligned with recesses 29 located between the lugs 28.

Having thus described our invention, what we claim is:

1. A pressure operated safety pop valve for high pressure boilers comprising a valve body provided at its lower end with an outwardly directed flange, a valve seat bushing slidably fitted in the lower portion of said body and out of direct contact therewith, a downwardly biased spring pressed valve arranged in said valve body and normally seating against a seat provided at the upper end of said bushing, a clamping flange positioned beneath and detachably secured to said body flange, said clamping flange loosely encircling a portion of the bushing extending below said body flange and being provided with a flat bottom surface adapted for clamping engagement with the flat upper surface of a thick ring of metal which is formed integral with the lower end of said bushing and constitutes an outwardly directed bushing flange, said bushing flange presenting a flat lower surface adapted to be clamped against a boiler flange or similar flat surface and having sufficient mass so that compression thereof between the clamping flange and the boiler flange or similar flat surface results in the transmission of only very small distortion strains to the wall of the bushing located above the bushing flange, the wall portion of the bushing located above the bushing flange being relatively thin as compared with said bushing flange and being of such length that the valve seat at the upper end of the bushing is located above the body flange and at a substantial distance from the bushing flange.

2. A safety pop valve as set forth in claim 1 characterized in that the wall portion of the bushing located above the bushing flange comprises a lower portion of relatively large diameter immediately adjacent the bushing flange and an upper portion of relatively small diameter, said upper and lower portions being joined together by an intermadiate portion which is diagonally inclined with respect to the axial centre line of the bushing, whereby the portion of the bushing adjacent the bushing flange possesses sufficient springiness to absorb all distortion strains set up by compression of said flange between the clamping flange and the boiler flange or other opposing surface.

3. In a safety valve assembly, a valve body having an opening in its lower end surrounded by an outwardly directed clamping flange, a valve seat bushing slidably fitted in said opening and being free of attachment to said body or to said flange, an outwardly directed flange formed at the lower end of said bushing adapted to be clamped in place beneath said clamping flange, a washer supported on said clamping flange and projecting inwardly beneath a washer engaging flange formed on the upper portion of the seat bushing, said washer cooperating with said washer engaging flange to support the seat bushing in said body prior to application of the valve assembly, said washer and washer engaging flange being separated from each other by relative sliding movement between the body and the seat bushing which occurs when the flange at the lower end of the seat bushing is clamped in place beneath said clamping flange.

4. A pressure operated safety pop valve for high pressure boilers comprising a valve body provided at its lower end with an outwardly directed flange, a valve seat bushing slidably fitted in the lower portion of said body and out of direct contact therewith, a downwardly biased spring pressed valve arranged in said valve body and normally seated against a seat provided at the upper end of said bushing, a clamping flange positioned beneath and detachably secured to said body flange, said clamping flange loosely encircling a portion of the bushing extending below said body flange and being provided with a flat bottom surface adapted for clamping engagement with the flat upper surface of a relatively thick ring of metal as compared with the thickness of the bushing wall which is formed integral with the lower end of said bushing and constitutes an outwardly directed bushing flange, said bushing flange adapted to be clamped between said clamping flange and a boiler flange or similar surface, and bushing supporting means located within said body and engageable with said bushing only when the valve assembly is removed or is being removed from the boiler or other high pressure container to which it is applied when in use, said bushing supporting means comprising one or more projections extending outwardly from a wall portion of the bushing which is located above said body and clamping flanges and means carried by said clamping flange adapted to be moved into supporting engagement with said projection or projections by upward movement of the body and clamping flanges relative to the bushing.

5. In a pressure operated safety pop valve assembly, a valve body having an opening at its lower end surrounded by a clamping flange detachably secured to said body, a valve seat bushing slidably fitted in said opening free of threaded connection with said body or said flange, a relatively thick flange formed integral with the lower end of said bushing and projecting outwardly therefrom to underlie said clamping flange, the upper portion of said bushing and clamping flange being provided with cooperating elements adapted to support the bushing in said body before the valve assembly is applied, said cooperating elements of the bushing and clamping flange being separated by relative sliding movement between the valve body and the bushing which occurs when the bushing flange is clamped in place beneath said clamping flange.

6. In a safety valve assembly, a valve body having an opening at its lower end surrounded by an outwardly directed clamping flange, a bushing slidably fitted in said opening and having an outwardly directed flange at its lower end adapted to be clamped beneath said clamping flange, lugs projecting inwardly from the inner periphery of the clamping flange at points located above the bushing flange and lugs projecting outwardly from the upper portion of the bushing adapted to rest on the first mentioned lugs to support the bushing in said body prior to application of the valve assembly, the two sets of lugs being separated by relative sliding movement of the body and bushing when the flange at the lower end of the bushing is clamped beneath said clamping flange.

FREDERICK W. BLANCHARD.
FREDERICK D. STIRLING.